United States Patent Office 3,336,803
Patented Aug. 22, 1967

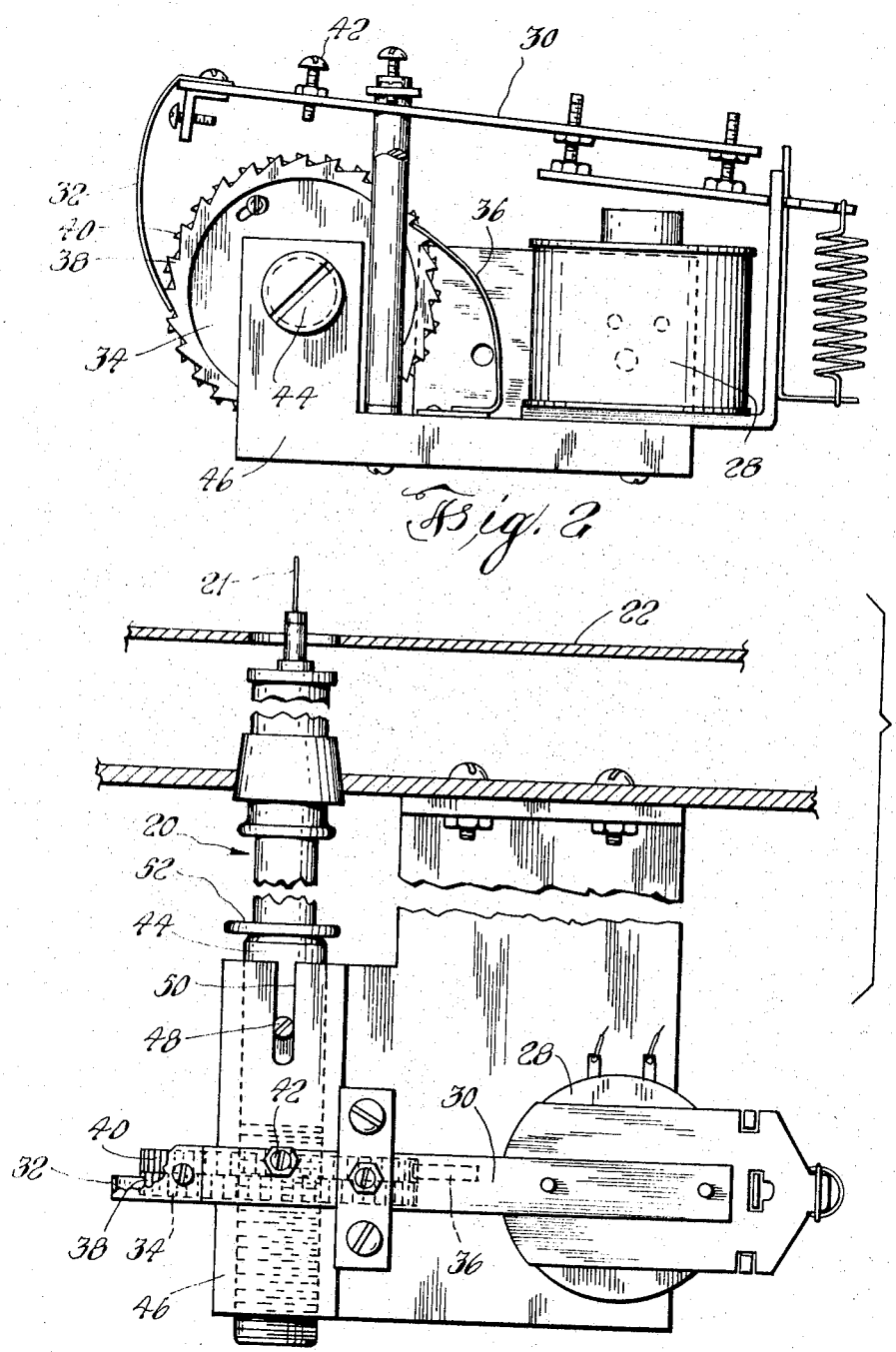

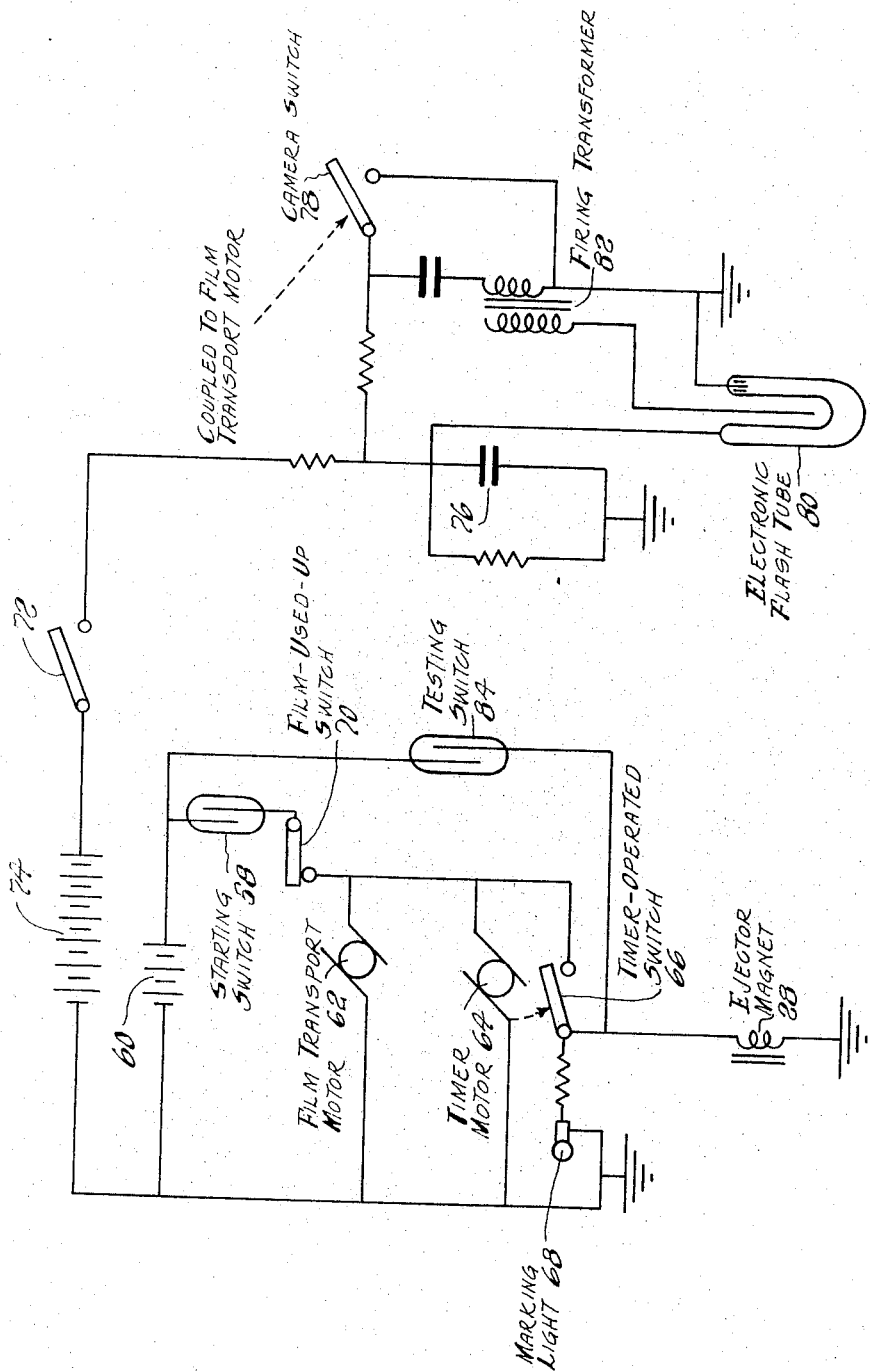

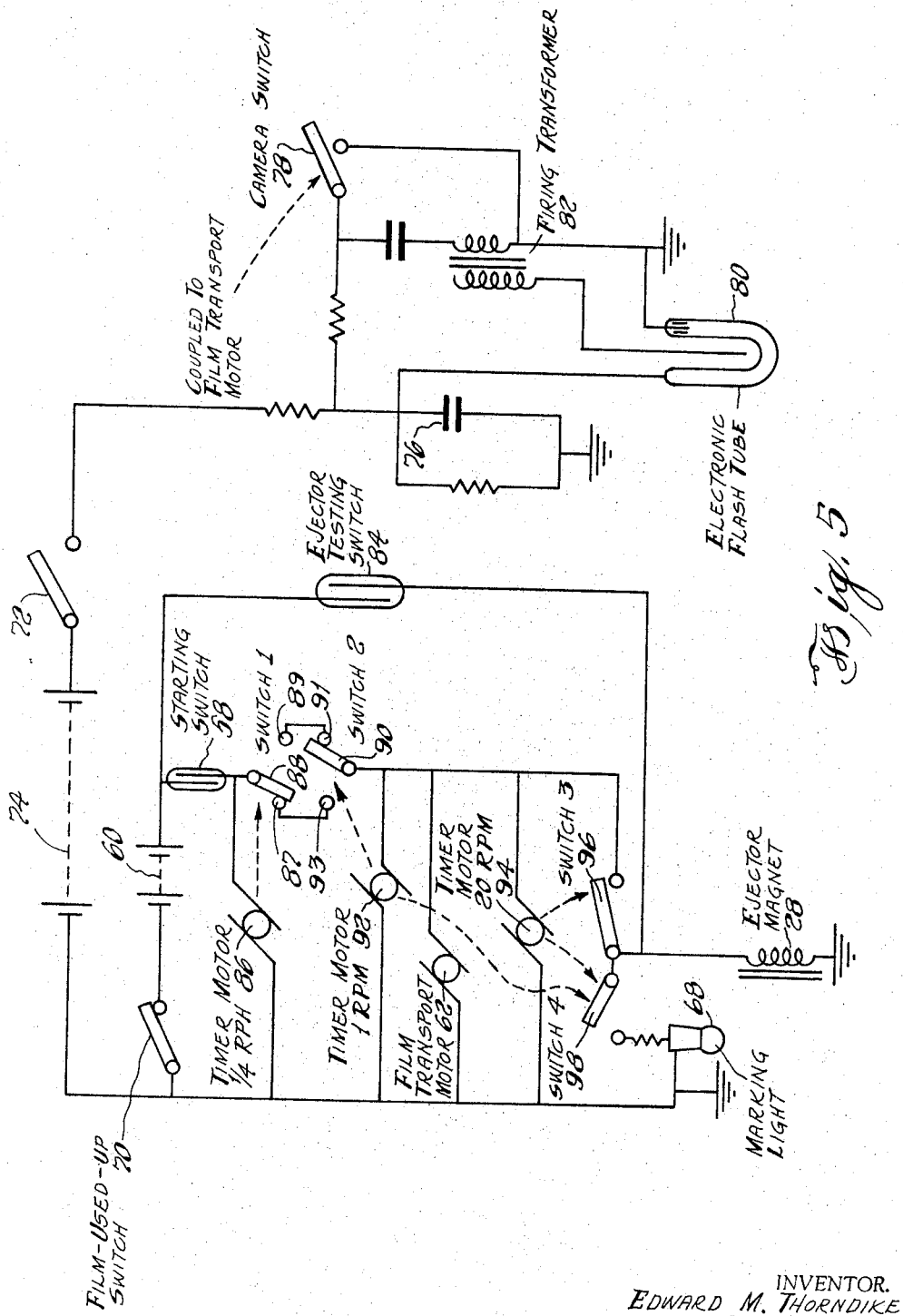

3,336,803
SUSPENDED-DROP CURRENT METER
Edward M. Thorndike, Montrose, N.Y., assignor to the United States of America as represented by the Secretary of the Navy
Filed Nov. 16, 1964, Ser. No. 411,653
8 Claims. (Cl. 73—194)

This invention relates to a device for measuring current-flow rates and especially to a suspended-drop current meter capable of measuring extremely low current rates.

There are many instruments of the "flow" type suitable for measuring current velocities in the range from approximately 0.1 knot to a few knots, a few capable of measurements below 0.1 knot, but essentially none capable of measurements below 0.01 knot. There is a need in oceanographic research for a current meter capable of measuring very small current velocities and also for a current meter capable of a very long range of measurements.

The present invention measures current flow velocities by the simple, direct method of providing an identifiable point in the water and determining its displacement in a known time interval. A typical embodiment of the invention comprises means for ejecting a small drop of liquid into a liquid medium whose velocity is to be measured, means for taking at least two time-spaced photographs of the drop, means for determining the displacement of the drop which has occurred in the elapsed time between the two photos and means for determining the elapsed time between the two photos. Knowing the time required for a given amount of displacement, it is simple to calculate the average current velocity during the time interval.

An object of the invention is to measure extremely small current velocities.

Another object is to measure current velocities by means of a simple instrument.

A further object is to provide a meter for measuring current velocities, said meter being capable of measuring extremely small current velocities and yet having a very wide range.

Other objects and many of the attendant advantages of this invention will be readily appreciated as the same becomes better understood by reference to the following detailed description when considered in connection with the accompanying drawings wherein:

FIG. 2 is a front view of the components of the ejector assembly;

FIG. 3 is a top view of the components shown in FIG. 2;

FIG. 4 is a schematic circuit diagram of the camera assembly components, the circuit being adapted for obtaining a single set of measurements in a short time; and FIG. 5 is a schematic circuit diagram of camera assembly components for a circuit which is adapted for use when the current meter is to be left on the bottom for a long period of time.

Figure 1:
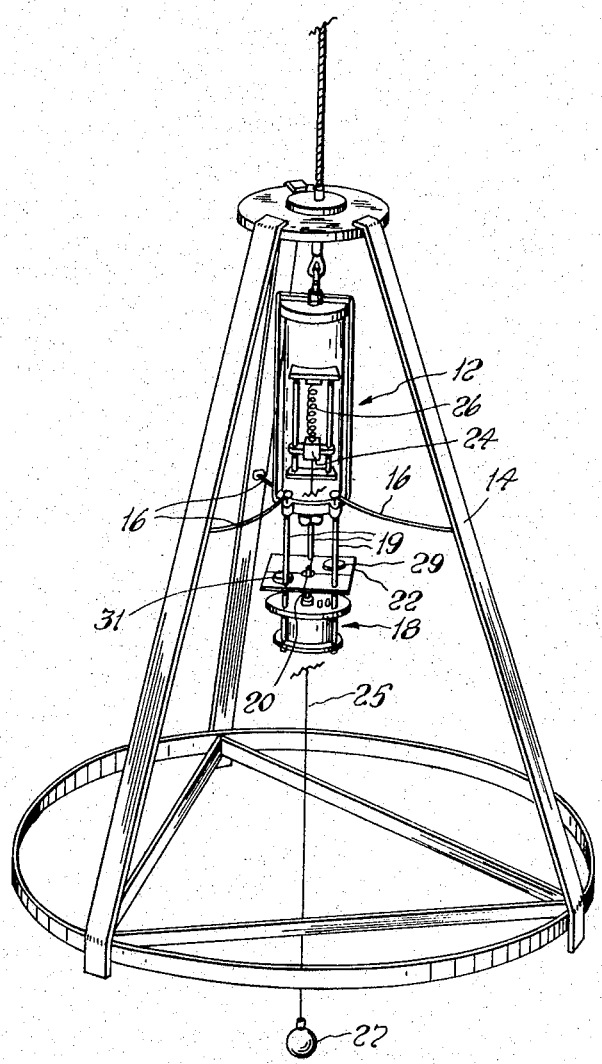
FIG. 1 is an isometric illustration of a complete unit of the invention including a supporting frame which is useful when ocean bottom measurements are to be made.

The suspended-drop current meter basically comprises ejector means for ejecting a small drop of fluid, camera and lighting means for photographing the drop, means for determining the distance moved by the drop in successive photographs and means for determining the elapsed time between successive photographs. Other components such as a watch and a compass may be included within the casing which houses the meter, but these are auxiliary components.

An ideal liquid for the drops would have the same density as sea water at all pressures, temperatures, and salinities, would be immiscible with sea water, and would be opaque. Such a liquid does not exist but reasonable approximations can be obtained. Mixtures of aniline and benzene darkened with the dye, Sudan 3, have worked well. The best mixture obtained so far has been ethyl benzoate and n-heptyl alcohol dyed with Sudan 3. Calculated densities of mixtures of ethyl benzoate and n-heptyl alcohol are given in the table below:

| Fraction of ethyl benzoate | Fraction of n-heptyl alcohol | Density at 20° C. | Density at 0° C. |
|---|---|---|---|
| 1.0 | 0.0 | 1.047 | 1.065 |
| .9 | .1 | 1.024 | 1.042 |
| .8 | .2 | 1.002 | 1.019 |
| .7 | .3 | .979 | .996 |
| .6 | .4 | .957 | .973 |
| .5 | .5 | .934 | .951 |

Clearly the densities of either fresh water or sea water can be matched.

FIG. 1 shows a complete unit for use on the ocean bottom. The camera assembly 12 is suspended from a three-legged supporting frame 14 and tied by cables 16 to each of the legs so that the assembly cannot move very far from a central position. The lens (or lenses, if a stereo camera is used) of the camera faces downward.

The ejector assembly 18 hangs from the camera assembly 12 supported by three rods 19 and is oriented so that each drop is ejected above the ejector assembly by the needle tip of a hypodermic syringe 20 which extends above a horizontally mounted background plate 22.

The background plate 22 has sets of ruled lines inscribed thereupon at known distances from each other and may have a watch and a compass mounted thereon. The inscribed lines provide a reference means for determining the displacement of any given drop. The camera photographs the drop against the background of the ruled lines, as well as the compass and watch readings.

A magnet 24 is located externally of the housing of the camera assembly. The magnet 24 is suspended from a spring 26 which is affixed at one end to the housing. A lead weight 27 hangs on a wire from the other end of the magnet 24 and stretches the spring 26.

In FIGS. 2 and 3, the ejector assembly 18 is shown as it appears when removed from its case. The ejector magnet 28 has an armature 30 to the end of which is attached a pawl 32 which engages the teeth of a ratchet wheel 34. Movement of the armature 30 moves the pawl 32 which turns the wheel 34. A second pawl 36 at the other side of the ratchet wheel 34 prevents the wheel from moving backwards.

The ratchet wheel 34 has a double set of teeth 38 and 40, the teeth of one set facing in the opposite direction from the teeth of the other set. A pin 42, which is mounted on the armature 30 of the ejector magnet 28, engages the second set of teeth 38 and provides a positive means of preventing the ratchet wheel 34 from moving more than one tooth for any single magnetic actuation.

The ratchet wheel 34 is supported by a rod 44 which is supported by and can slide within a block of metal 46. The ratchet wheel 34 is threaded around the rod 44. The rod 44 is prevented from turning by a pin 48 (which can move within a slot 50 in the block 46) but is not prevented from moving in translational motion (to the left in FIG. 3). The tip of the rod 44 is in contact with the plunger 52 of the hypodermic syringe 20 and the translational movement of the rod is thus imparted to the plunger 52, whereby a drop of liquid is ejected from the needle tip 21 of the syringe.

FIG. 4 shows a circuit diagram containing the camera, lighting and control components which are all contained within the camera assembly 12 except for the ejector magnet 28. This particular set of components and circuit is suitable for use when the current meter is lowered to the bottom and a single set of observations is made in a short time, as might be done from an unanchored ship, for example.

After the camera has been loaded with film, it is inserted in its housing and the complete unit is lowered to the bottom. The weight 27 strikes the bottom first, releases the tension on the wire 25 and allows the spring 26 to pull the magnet 24 up to a position on the outside of the camera assembly housing adjacent the starting switch 58, which is a magnetic reed switch. The field of the magnet 24 closes the switch 58 permitting voltage from a battery 60 to be applied to a film transport motor 62 and a timer motor 64. The speed of the timer motor 64 is controlled by a governor so that it closes the timer-operated switch 66 at equal, known intervals of time. Each time the timer-operated switch 66 is closed, the ejector magnet 28 is energized and a drop of liquid is ejected into the water. A small marking light 68 is also energized at the same time and marks the edge of the film so that the position of the drop when it is first ejected can be ascertained. The time between one exposure and the next can now be found from the known time between marking light flashes and the distance along the film between exposures. In like manner, the time interval between the ejection of a drop and the next exposure can be obtained. Thus the displacement of a drop in a known time interval can be obtained and the velocity can be calculated.

The film passes over a roller which bears against a microswitch 70 and keeps it closed. When the film is used up, the pressure of the roller against the microswitch 70 is released and the switch 70 opens cutting off the supply voltage to the motors and the marking light.

The photolighting circuit is a standard circuit for an electronic flash tube. A toggle switch 72 is closed before the camera unit is placed in its housing. This allows the power supply 74 to charge the storage condenser 76. A camera switch 78 which is coupled to a roller that is rotated by the motion of the film, is closed once for every rotation of the roller (other timings may be employed as desired for particular applications). Closing of the camera switch 78 permits the energy stored in the condenser 76 to be applied to the electronic flash tube 80 through a firing transformer 82 and an exposure is made on the film at the time of the flash.

As a typical example of specific components which may be employed, an FT-118 flash may receive energy from a 30 mfd. condenser charged either by two 240-volt Everready #491 photoflash batteries or by a low-voltage battery and a transistorized push-pull D.C. to D.C. converter giving approximately 450 volts.

The camera may be similar to the underwater camera described in the article entitled, "Deep-Sea Cameras of the Lamont Observatory," by E. M. Thorndike, published in vol. 5, pages 234–237, of Deep-Sea Research. This camera happens to be a stereo camera. Two 35 mm. Leitz Summaron lenses with their axes 1¼" apart provide a pair of photographs from which three coordinates can be obtained for each drop being studied. The roller and cam arrangement that controls the amount of film which is transported allows approximately 2½" of film to pass between exposures. Thus each photograph is approximately 1¼" square. For slow transport, the usual Type-AV Brailsford motor is satisfactory. Type-BH Brailsford motors can be used to give somewhat higher speeds. For the fast transport needed for measuring currents of 0.1 knot or more, Hansen #7100D motors have been employed. With these motors, two pairs of photographs per second can be obtained. The film spools hold up to 25 feet of film giving approximately 120 pairs of photographs.

If desired, a testing switch 84 of the magnetic reed type can be included in the camera assembly for testing the operation of the ejector magnet after the camera unit has been housed and just prior to lowering the entire unit to the bottom. A magnet placed outside the housing near the location of this switch will close the switch and allow energization of the ejector magnet and emission of a drop if the ejector assembly is operating properly.

The circuit shown in FIG. 5 is suitable for use when the current meter is buoyed and left on the bottom for several hours, or with modifications of the timer speeds, for several days. Many of the components and operations are the same as those shown in FIG. 4 and therefore will not be redescribed.

As for the operation of the timing circuits, before lowering the meter to the ocean bottom, a cam extending halfway around the shaft of the ¼ r.p.h. timer motor 86 is rotated to such a position that it will actuate the first switch 88 after any desired interval up to two hours. When the first switch 88 is actuated, the pole is thrown from the left contact 87 to the right contact 89 and the film transport motor 62, the 1 r.p.m. timer motor 92 and the 20 r.p.m. timer motor 94 are all energized.

The 20 r.p.m. timer motor 94 is provided with either one or two cams for closing the third switch 96. If there is one cam, the switch 96 is closed every three seconds; if two cams, the switch is closed every 1½ seconds. Each time the third switch 96 closes, the ejector magnet 28 operates and the marking light 68 puts a mark on the film.

All motors except the ¼ r.p.h. timer motor 86 are de-energized by a cam on the 1 r.p.m. timer motor 92 which operates the pole of the second switch 90 throwing it to the left to break contact with contact 91 and to make contact with contact 93.

The operational sequence is repeated when the ¼ r.p.h. timer motor 86 rotates far enough for its cam to allow the first switch 88 to return to its original position (two hours if there is only one cam).

The 1 r.p.m. timer motor 92 also actuates the fourth switch 98 which energizes the marking light 68 so that it can be determined where one series of exposures ends and the next begins.

Obviously many modifications and variations of the present invention are possible in the light of the above teachings. It is therefore to be understood that within the scope of the appended claims the invention may be practiced otherwise than as specifically described.

I claim:
1. An instrument for measuring the velocity of flow of a fluid comprising, in combination:
   ejector means for ejecting a drop of a first fluid into said fluid the velocity of which is to be measured, said drop of said first fluid being immiscible with and visibly differentiable from said fluid;
   camera means disposed in fixed relationship to said ejector means at a selected distance therefrom and adapted to make at least two time-spaced photographs of said drop;
   reference means positioned in the field of view of said camera beyond said ejector means for indicating the distance said drop has moved in the time interval between said photographs; and
   means for determining the time interval between said photographs;
   whereby current velocity may be readily determined by dividing the distance a drop moves between photographs by the time interval between said photographs.

2. An instrument as set forth in claim 1, wherein said ejector means comprises:
   a magnet having an armature;
   a pawl affixed to said armature;
   a circumferentially toothed ratchet wheel having a threaded, circular, centrally located excision, said pawl being in contact with the toothed circumference of said ratchet wheel;

a block of rigid material formed with shoulders between which said ratchet wheel is located and which bear against said ratchet wheel;

a rod slidably supported by said block, said rod being exteriorly threaded and serving as an axle for said ratchet wheel with which it is threaded in nut-and-bolt relationship;

a pin affixed to said rod and cooperating with said block to prevent rotation of said rod when said ratchet wheel rotates, whereby said rod is forced to slide instead;

and a hypodermic syringe having a plunger, a body and a needle tip, one end of said rod being in contact with said plunger so that a drop of said first fluid is ejected from the syringe each time said ratchet wheel is rotated the distance of one tooth by movement of said pawl.

3. An instrument as set forth in claim 1, wherein said camera means comprises:

a camera adapted for use in said fluid;
film transport means;
timer means including a motor and a switch operated by said motor at predetermined intervals for actuating said ejector means at said predetermined intervals;
means for actuating said film transport means and said timer means; and
an electronic flash lamp, a power supply therefor, and a switch for connecting said power supply to said flash lamp at predetermined intervals, said switch being coupled to and operated by said film transport means.

4. An instrument as set forth in claim 1, wherein said means for measuring the distance said drop has moved comprises:

a background plate having ruled lines thereon spaced known distances from each other, said plate being mounted in such location that said drop of said first fluid is between said camera means and said plate, so that said drop is photographed with said plate as a background.

5. An instrument as set forth in claim 1, wherein said means for determining the time interval between said photographs comprises:

a marking light coupled to said ejector means, a power source and said camera means so as to be energized simultaneously with the energization of said ejector means.

6. An instrument as set forth in claim 1, wherein said camera means is adapted to make a series of sets of photographs of said drop, each set containing at least two time-spaced photographs, and wherein said camera means comprises:

a camera;
film transport means;
a first slow-speed timer motor, first switch means, a second medium-speed timer motor, and a third fast-speed timer motor, said first switch means being closed by said first timer motor and opened by said second timer motor so that said switch is alternately closed for a short period and opened for a long period of time, said second timer motor, film transport means and third timer motor being actuated when said switch is closed and deactuated when said switch is opened; and
second switch means operated by said third timer motor for energizing said ejector means at predetermined intervals.

7. An instrument as set forth in claim 6, further including:

rigid supporting framework means to which said other above set forth means are attached for suspension above a surface such as the ocean floor.

8. An instrument for measuring the velocity of flow of a current of fluid comprising, in combination:

ejector means for ejecting a drop of a first fluid into a second fluid, the velocity of which second fluid is to be measured, said drop of fluid being immiscible with and visibly differentiable from said second fluid;
camera means affixed to said ejector means at a fixed distance therefrom for making at least two time-spaced photographs of said drop;
means for measuring the distance said drop has moved in the time interval between said photographs;
means for determining the length of the time interval between said photographs, the velocity of flow of the second fluid being calculated by dividing the distance by the period of the time interval; and
rigid supporting framework means to which said other means above set forth are attached for suspension above a surface such as the ocean floor.

References Cited

UNITED STATES PATENTS

| 1,865,373 | 6/1932 | Idrac | 73—189 |
| 2,663,217 | 12/1953 | Tuttle et al. | 73—489 XR |
| 2,913,900 | 11/1959 | Andrews | 73—189 |
| 3,040,566 | 6/1962 | Sortor | 73—194 XR |

JAMES J. GILL, *Primary Examiner.*

RICHARD C. QUEISSER, *Examiner.*

C. A. RUEHL, *Assistant Examiner.*